United States Patent [19]
Cockrell, Jr.

[11] Patent Number: 5,137,793
[45] Date of Patent: Aug. 11, 1992

[54] COOKING EQUIPMENT PRETREATMENT COMPOSITION AND METHOD OF USE

[75] Inventor: John R. Cockrell, Jr., Greensboro, N.C.

[73] Assignee: Kay Chemical COmpany, Greensboro, N.C.

[21] Appl. No.: 561,467

[22] Filed: Aug. 1, 1990

[51] Int. Cl.$^5$ .................. B32B 19/00; B05D 1/00; B09B 17/00
[52] U.S. Cl. ........................ 428/688; 134/19; 134/20; 252/140; 252/156; 252/160; 252/174.25; 428/704; 428/411.1; 427/154; 427/156; 427/236; 427/239; 427/327; 427/397.8
[58] Field of Search .............. 427/156, 154, 236, 239, 427/327, 397.8; 134/19, 20; 252/140, 156, 160, 174.25; 428/688, 704, 457, 469

[56] References Cited

U.S. PATENT DOCUMENTS

| | | | |
|---|---|---|---|
| 3,658,711 | 4/1972 | Mukai et al. | 428/688 |
| 3,736,259 | 5/1973 | Buck et al. | 252/140 |
| 3,827,983 | 8/1974 | Mitchell et al. | 252/89 |
| 3,910,854 | 10/1975 | Meyer | 134/20 |
| 3,941,713 | 3/1976 | Dawson et al. | 427/156 |
| 4,019,998 | 4/1977 | Benson et al. | 252/140 |
| 4,019,999 | 4/1977 | Ohren et al. | 252/140 |
| 4,040,972 | 8/1977 | Roebke | 252/140 |
| 4,131,558 | 12/1978 | Bailey et al. | 252/140 |
| 4,184,975 | 1/1980 | Krings et al. | 252/140 |
| 4,214,915 | 1/1980 | Dillarstone et al. | 134/19 |
| 4,512,908 | 4/1985 | Hale | 252/140 |
| 4,528,039 | 7/1985 | Rubin et al. | 252/140 |
| 4,877,691 | 10/1989 | Cockrell . | |

FOREIGN PATENT DOCUMENTS 1275740 5/1972 United Kingdom .

Primary Examiner—Janyce Bell
Attorney, Agent, or Firm—Finnegan, Henderson, Farabow, Garrett & Dunner

[57] ABSTRACT

A food-safe composition for the pretreatment of a surface, preferably an oven or a broiler, which may be subjected to heat is liable to soiling by organic food deposits, especially baked-on food deposits. A food-safe, inorganic thickening agent which is substantially insoluble in an alkaline aqueous composition and which is present in an amount sufficient so that, during application to the surface, the composition is capable of forming a continuous coating adhered to all desired portions of the surface, is combined with (1) an alkaline, food-safe, water-soluble inorganic salt in an amount sufficient so that the composition is readily removable with water or an aqueous solution after the composition has been dried and soiled and (2) a high-boiling, organic component selected from the group consisting of
(a) ethers having more than seven carbon atoms and
(b) aliphatic esters having carboxylic acid-derived portions of more than seven carbon atoms, wherein said high-boiling, organic component is present in an amount sufficient so that the continuous coating remains continuous as the coating dries.

The composition forms a film after drying, preferably by heating, which remains continuous over all portions of the surface, including areas which may already be soiled with food deposits. After the film accumulates additional food soils, the soiled film can be readily removed by contact with water or an aqueous solution.

54 Claims, No Drawings

COOKING EQUIPMENT PRETREATMENT COMPOSITION AND METHOD OF USE

BACKGROUND OF THE INVENTION

The present invention relates to the cleaning of surfaces such as the surfaces of cooking equipment, for example, ovens or broilers, which may be subject to heat and are liable to soiling by organic food deposits, especially baked-on organic food deposits. The soiling matter deposited on these surfaces typically consists of a complex mixture of natural fats and other organic deposits from the cooking of food. When heated at normal oven or broiler operating temperatures, this soiling matter may be converted into a polymeric mass in which part of the organic material may also be carbonized.

The removal of this type of soil is a considerable problem, especially in restaurants where ovens and broilers are used to cook large amounts of food and the resulting soil levels are high. Removal of badly burned soils requires the use of highly alkaline, unsafe oven cleaners (typically based on sodium or potassium hydroxide) and/or laborious scrubbing and scraping. The time, effort, and safety risk involved are such significant deterrents to regular cleaning, for example, on a daily basis, that restaurant ovens, broilers, and other surfaces liable to soiling by organic food deposits are often chronically soiled.

Oven cleaners containing alkali materials less alkaline than caustic soda are known. For example, U.S. Pat. No. 3,658,711 issued Apr. 25, 1972 to Mukai et al., and British Patent No. 1,275,740 published May 24, 1972 disclose the use of alkali metal phosphates combined with an amine component or "enhancing agent" and other optional ingredients such as, for example, surfactant, abrasives, thickening agents or suspending agents. However, such oven cleaners are not very effective in saponifying baked-on fat and, consequently, are not efficient oven cleaners. Further, such products, when applied to soiled oven surfaces, must attack the soiling matter from the outer surface, while the most severe polymerization and carbonization are generally present in the interior of the soil layer, adjacent to the oven wall.

In contrast to oven cleaners, oven pretreatment compositions which are applied to oven surfaces prior to soiling and then removed after soiling are also known. For instance, U.S. Pat. No. 4,877,691 to Cockrell discloses a composition comprising an inorganic thickening agent and an alkaline, water-soluble organic salt. The composition forms a food-safe coating which adheres to all portions of an oven surface and, in a clean oven, remains continuous as the coating dries. The resulting dried film is resistant to scuffing and chipping at typical oven temperatures and prevents fats and other food soils from burning onto exposed oven surfaces. After soiling, the film and the accompanying spattered food soils are easily removable by water or an aqueous solution.

The composition of U.S. Pat. No. 4,877,691, however, may not always remain adhered to surfaces which have already been soiled by organic food deposits, especially baked-on organic food deposits, which have not been removed in previous attempts to clean the surface. Thus, there is a need in the oven cleaning art for a pretreatment composition to be applied not only to a clean oven but also to an oven or broiler surface which may not be completely free from food soils when the composition is applied.

Further, the composition of U.S. Pat. No. 4,877,691 typically dries to form a film which may be hazy or opaque in appearance. This hazy or opaque appearance tends to obscure, at least to some extent, the original surface of the oven and may be considered aesthetically undesirable by some users. Thus, there has also been a need in the oven cleaning art for a pretreatment composition which, when applied to a desired surface to form a continuous coating, dries to form a substantially transparent film through which the original surface of the oven remains visible.

SUMMARY OF THE INVENTION

It has been found, according to the present invention that the composition of U.S. Pat. No. 4,877,691 can be modified to produce a coating with excellent adhesion which remains continuous as the coating dries, even over portions of the desired surface from which all previously accumulated food soils may not have been removed. Specifically, it has been found that certain compositions, applied in the form of an aqueous or nonaqueous liquid, solid or semisolid, form an alkaline, food-safe coating which is continuous and adheres to all desired surfaces which may be subjected to heat and liable to soiling with organic food deposits. The coating of the invention remains continuous as the coating dries, and the resulting dried durable film is resistant to scuffing or chipping.

Further, in a preferred embodiment composition of the invention produces a dried film which becomes substantially transparent in the temperature range of about 350° to 450° F., thus preserving the original appearance of the pretreated surface when heated. Finally, the soiled film is quickly and easily removed with water or an aqueous solution.

One aspect of the present invention is a food-safe composition for the pretreatment of a surface which is liable to soiling by organic food deposits, the composition consisting essentially of:

a. a food-safe, inorganic thickening agent which is substantially insoluble in an alkaline aqueous composition and which is present in an amount sufficient so that, during application to the surface, the composition is capable of forming a continuous coating adhered to all desired portions of the surface;

b. an alkaline, food-safe, water-soluble inorganic salt in an amount sufficient so that the composition is readily removable with water or an aqueous solution after the composition has been dried and soiled; and c. a high-boiling, organic component selected from the group consisting of (1) ethers having more than seven carbon atoms and (2) aliphatic esters having carboxylic acid-derived portions of more than seven carbon atoms, wherein the high-boiling, organic component is present in an amount sufficient so that the continuous coating remains continuous as the coating dries.

In another aspect of the present invention, a continuous film is adhered to a surface which is liable to soiling by organic food deposits, the film having been dried, consisting essentially of:

a. a food-safe, inorganic thickening agent which is substantially insoluble in an alkaline aqueous composition and which is present in an amount sufficient so that the film has been produced from a continuous coating adhered to all desired portions of the surface;

b. an alkaline, food-safe, water-soluble inorganic salt in an amount sufficient so that the film is readily removable with water or an aqueous solution after soiling; and
c. a high-boiling, organic component selected from the group consisting of (1) ethers having more than seven carbon atoms and (2) aliphatic esters having carboxylic acid-derived portions of more than seven carbon atoms, wherein the high-boiling, organic component is present in an amount sufficient so that the film is still continuous after drying.

Still another aspect of the present invention involves a method for cleaning a desired surface which is liable to soiling by organic food deposits comprising the steps of:
a. applying to the surface a food-safe composition consisting essentially of:
  i. a food-safe, inorganic thickening agent which is substantially insoluble in an alkaline aqueous composition and which is present in an amount sufficient so that the composition is capable of forming a continuous coating adhered to all desired portions of the surface;
  ii. an alkaline, food-safe, water-soluble inorganic salt in an amount sufficient so that the composition is readily removable with water or an aqueous solution after the composition has been dried and soiled; and
  iii. a high-boiling, organic component selected from the group consisting of (1) ethers having more than seven carbon atoms and (2) aliphatic esters having carboxylic acid-derived portions of more than seven carbon atoms, wherein the high-boiling, organic component is present in an amount sufficient so that the continuous coating remains continuous as the coating dries, to form a continuous coating on the surface;
b. drying the continuous coating to form a film;
c. allowing the film to become soiled; and
d. removing the soiled film by contacting the soiled film with water or an aqueous solution.

DETAILED DESCRIPTION OF THE INVENTION

The inorganic thickening agent used in making the composition described herein may be any one of a number of natural and synthetic food-safe, inorganic materials, such as clays, silicas, aluminas, titanium dioxide (pyrogenic) and calcium and/or magnesium oxides. All of these materials are readily available commercially.

Various types of clays which are useful include kaolins such as kaolinite, dickite, nacrite, halloysite and endillite; serpentine clays such as chrysotile and amesite; smectites such montmorillonite (derived from bentonite rock), beidellite, nontronite, hectorite, saponite and sauconite; illites or micas; glauconite; chlorites and vermiculites; attapulgite and sepiolite. Mixed layer clays exhibiting intercalation of mineral sandwiches with one another may be used, such as, for example, mixed-layer clay mineral sheets of illite interspersed randomly or regularly with montmorillonite, or chlorite with one of the other types of clay, such as vermiculite. Other useful clays include amorphous clays, such as allophane and imogolite, and high-alumina clay minerals such as diaspore, boehmite, bibbsite and cliachite.

Various types of silicas which are useful include diatomite, precipitated silica and fumed silica.

Various types of aluminas may be used. Various types of calcium and magnesium oxides may also be employed. The thickening agent preferably forms stable suspensions such that it stays suspended within the aqueous composition indefinitely without repeated agitation, such as shaking, by the user. Preferred thickening agents are clay materials, more preferably smectite clay materials having the following formulae:

| Mineral | Formula |
| --- | --- |
| montmorillonite | $[Al_{1.67}Mg_{0.33}(Na_{0.33})]Si_4O_{10}(OH)_2$* |
| beidellite | $Al_{2.17}[Al_{0.33}(Na_{0.33})Si_{3.17}]O_{10}(OH)_2$ |
| nontronite | $Fe(III)[Al_{0.33}(Na_{0.33})Si_{3.67}]O_{10}(OH)_2$ |
| hectorite | $[Mg_{2.67}Li_{0.33}(Na_{0.33})]Si_4O_{10}(OH,F)_2$ |
| saponite | $Mg_{3.00}[Al_{0.33}(Na_{0.33})Si_{3.67}]O_{10}(OH)_2$ |
| sauconite | $[Al_{0.99}Si_{3.01}]O_{10}(OH)_2X_{0.33}$ |

*$Na_{0.33}$ or $X_{0.33}$ refers to the exchangeable base (cation) of which 0.33 equivalent is a typical value.

Of these smectite class, montmorillonite clays derived from bentonite rock are particularly preferred. The chemical analysis for montmorillonite clay from Montmorillon, France is as follows:

| Component | % |
| --- | --- |
| $SiO_2$ | 51.14% |
| $Al_2O_3$ | 19.76 |
| $Fe_2O_3$ | 0.83 |
| MnO | trace |
| ZnO | 0.10 |
| MgO | 3.22 |
| CaO | 1.62 |
| $K_2O$ | 0.11 |
| $Na_2O$ | 0.04 |

Montmorillonite has a three-layer plate-shaped crystalline structure. The three-layer sheets or platelets consist of a middle octahedral alumina layer and two outer tetrahedral silica layers. Because of lattice defects in the alumina, and less often in the silica layers, the flat planar surfaces are negatively charged and have associated cations (primarily sodium and calcium to achieve electroneutrality. Montmorillonite hydrates in the presence of water and disperses to varying degrees, depending on the nature of the cations that are loosely held and exchangeable. As hydration proceeds, the individual platelets separate and eventually form a suspension which is stabilized by electrical interactions between clay platelets and which exhibits highly nonNewtonian rheological properties.

Most preferably, the thickening agent of the invention is selected from a group of complex magnesium aluminum silicates derived from natural smectite clays by a proprietary refining process and sold by R. T. Vanderbilt Company, Inc. under the trademark VEE-GUM ®. Chemical analyses of these clay derivatives reveal the presence of the following compounds in the following ranges of amounts by weight percent:

| Component | % |
| --- | --- |
| Silicon dioxide | 62.0–69.0% |
| Magnesium oxide | 2.9–11.9 |
| Aluminum oxide | 10.5–14.8 |
| Ferric oxide | 0.7–1.8 |
| Calcium oxide | 1.1–2.4 |
| Sodium oxide | 2.2–2.6 |
| Potassium oxide | 0.4–1.9 |
| Ignition loss | 7.5–9.0 |

A particularly preferred clay derivative is a grade commercially available from R. T. Vanderbilt Company, Inc. under the trade name VEEGUM HS ® and having the chemical analysis:

| Component | % |
| --- | --- |
| Silicon dioxide | 69.0% |
| Magnesim oxide | 2.9 |
| Aluminum oxide | 14.7 |
| Ferric oxide | 1.8 |
| Calcium oxide | 1.3 |
| Sodium oxide | 2.2 |
| Potassium oxide | 0.4 |
| Ignition loss | 7.6 |

VEEGUM HS ®, in particular, forms excellent suspensions having increased viscosity in water without settling out over time or completely losing pourability.

The thickening agent and all other ingredients of the composition of the present invention are preferably food-safe, that is, non-toxic even when internally consumed at abnormally high levels over an extended period of time, such as 90 days. Preferably, the thickener is one that is classified by the Food and Drug Administration as "generally recognized as safe" (GRAS) as a direct human food ingredient based upon "current good manufacturing practice conditions of use." 21 C.F.R. Ch. 1, §184.1155. An example of such a thickener is "bentonite" ($Al_2O_3.4SiO_2.nH_2O$, CAS Reg. No. 1302-78-9), which contains varying quantities of iron, alkali metal and alkaline earth metal cations in corresponding commercial products, as described at 21 C.F.R. Ch. 1, §184.1155. VEEGUM HS ® clay is a type of bentonite which contains magnesium cations.

The amount of the thickening agent present in the aqueous composition must be sufficient so that the composition is capable of forming a continuous coating with essentially no holes or gaps and capable of adhering when applied to all desired surfaces, particularly to vertical surfaces. To achieve formation of a continuous coating, the amount of thickener present in the composition of the present invention can vary widely depending on the amount of water-soluble inorganic salt present, the amount of the organic component present, and on the amount and character of mixing used to combine the thickener with water. However, the relative amount of thickener is usually from about 0.5 part to about 10 parts by weight, preferably 1.0 to 3.0 parts by weight, more preferably 2.0 to 2.5 parts by weight, and most preferably about 2.15 parts by weight. One of ordinary skill in the art can readily determine an appropriate amount of thickener.

When water is present in the composition, the preferred amounts of the thickening agent are sufficient to produce a viscous, but still sprayable, liquid. Depending on the amount and type of thickener used, it may be necessary to shake the composition well before spraying.

With respect to viscosity, compositions containing many of the thickeners of the invention do not have the viscosity characteristics of Newtonian liquids in which the viscosity is constant and independent of shear rate. Instead, in many cases, the viscosity profile of the compositions is such that a certain minimum amount of shear stress is required before flow takes place. Such properties may be conveniently expressed in terms of a rheological measurement-yield value.

Experience has shown that the following Casson Equation basically describes the viscosity profile of most compositions suitable for use in the present invention.

$$n_{DN} = n^N + (T_o/D)^N$$

where
T = shear stress;
$T_o$ = yield value (dynes/cm$^2$);
D = shear rate (sec$^{-1}$);
$n_D$ = viscosity at shear rate D;
$n_{28}$ = viscosity at infinite shear; and
N = exponent (commonly 0.5).
Assuming that N = 0.5, $$\sqrt{n_D} = \sqrt{n_\infty} + \sqrt{T_o/D}$$

and, multiplying through by D, remembering that n = T/D, $$\sqrt{T} = \sqrt{n_\infty} \cdot \sqrt{D} + \sqrt{T_o} .$$

Thus, a plot of $\sqrt{T}$ vs. $\sqrt{D}$ be a straight line with a slope of $\sqrt{n_\infty}$ and a y intercept of $\sqrt{T_o}$.

For the aqueous compositions of the invention, the yield value before application to appropriate surfaces should preferably be greater than about 10 dynes/cm$^2$ to prevent settling out of the contents of the composition, for example, during storage. However, the yield value should be somewhat less than about 2.5 dynes cm$^2$ immediately after application to assure a continuous coating with essentially no gaps or holes. Further, a recovery of the yield value to about 5 dynes/cm$^2$ or higher shortly after application is desirable to prevent running or sagging of the coating. A balance exists between preventing undue sagging by prompt recovery of yield value, on one hand, and allowing sufficient time for initial flow of the composition onto the surface to form a continuous coating, on the other hand. For any given thickener useful in the present invention, one skilled in the art can routinely determine the proper balance.

Another embodiment of the invention comprises an aqueous composition not having the above-indicated yield values, but which is capable of forming a continuous coating adhered to all desired surfaces by application, for example by spraying, to a preheated surface.

Yet another embodiment comprises a solid or semi-solid composition, such as a waxy solid, not having the above-indicated yield values, but which can be evenly applied by spreading or rubbing onto the desired surface.

The alkaline, water-soluble, food-safe inorganic salt of the aqueous composition can be any water-soluble salt, preferably capable, either alone or in combination with a food-safe acid or base, of imparting moderate alkalinity to the composition and capable of forming, when mixed with the thickener in the composition of the invention, a dried film which is readily removable with water or an aqueous solution. Preferably, the water-soluble salt is also hygroscopic.

Examples of useful water-soluble salts include phosphates, such as monosodium phosphate, disodium phosphate, and trisodium phosphate; condensed phosphates, such as sodium tripolyphosphate, tetrasodium pyrophosphate, sodium acid pyrophosphate and sodium hexametaphosphate; and the corresponding potassium and lithium phosphates such as tripotassium phosphate and potassium tripolyphosphate; alkali metal carbonates such as sodium, potassium and lithium carbonates; and soluble silicates such as sodium orthosilicate, anhydrous sodium metasilicate, pentahydrate sodium metasilicate, 2.0 ratio sodium silicate, 2.4 ratio sodium silicate and 3.22 ratio sodium silicate.

Although some of these water-soluble salts are acidic, it is intended that such acidic salts be used in combination with any suitable food-safe base. As used herein, the combination of acidic water-soluble salt and food-safe base is included within the meaning of the term alkaline, water-soluble salt. A preferred group of inorganic salts includes the phosphates and condensed phosphates with tripotassium phosphate, sodium tripolyphosphate and potassium tripolyphosphate being particularly preferred.

The amount of the alkaline, water-soluble inorganic salt present in the aqueous composition of the invention can vary widely. The maximum amount that can be present is limited only by the solubility of the salt, which can be as much as 100–200 grams of the anhydrous salt per 100 grams of water (50–67% by weight).

The minimum amount is controlled by the concentration necessary so that the composition is readily removable with water or an aqueous solution after the composition has been dried and soiled. However, an additional amount of at least one other neutral salt, for example, an alkali metal halide salt such as NaCl or KCl, may desirably be added to maintain a sufficiently high yield value and to assure easy and ready removability of the dried film. Further, it may be desirable to add minor amounts of a second salt which is hygroscopic to facilitate the at least partial hydration of the dried film. It is desirable that the dried film at least partially hydrate because this is thought to contribute to saponification by the film of spattered fat. Preferably, the minimum relative amount of water-soluble inorganic salt in the composition varies from about 0.05 part to about 3.0 parts by weight.

In a particularly preferred embodiment, the relative amount of inorganic salt present in the composition varies from about 0.05 part to about 67 parts by weight, typically from about 1.0 to about 50 parts by weight, preferably from about 1.5 to about 25 parts by weight, most preferably from about 2.0 to about 12 parts by weight.

The high-boiling organic component of the invention can be either (1) an ether having more than seven carbons or (2) an aliphatic ester having a carboxylic acid-derived portion of more than seven carbons. Useful ethers having more than seven carbon atoms include n-butyl ether, n-propyl n-butyl ether, n-propyl t-butyl ether, polyethylene glycols such as that sold by Dow Chemical under the trade name E-400 NF, polypropylene glycols such as that sold by Dow Chemical under the trade name P-2000 and P-4000, polyglycol copolymers such as that sold by Dow Chemical under the designations 112-2 and 15-200. These aliphatic ethers are particularly useful in compositions of the invention to be used on surfaces subjected to mild temperatures ranging from about ambient temperature to those of a moderately hot oven, such as about 300° to about 350° F.

Useful aliphatic esters having carboxylic acid-derived portions of more than seven carbons include vegetable oils and animal derived fatty materials. Useful vegetable oils include soybean oils, cottonseed oils, other vegetable cooking or salad oils, lecithin, pentaerythritol tetraoctanoate. Useful animal derived fatty materials include lard, butter and beef suet.

Preferred high-boiling, organic components are vegetable oils such as the soybean oils sold by Anderson Clayton/HumKo, a division of Kraft, under one or more of the trade names PS-12 (a soybean oil which has been partially hydrogenated to produce a semisolid material); BR-16 HLF (a soybean oil having a low inherent viscosity); Spec. 8899 oil; and BI-20. Preferred cottonseed oils include those sold under the trade names BI-74 and BS-350 HLF with TBHQ (a low inherent viscosity cottonseed oil with antioxidant). Preferably, the useful high-boiling, organic component is a soybean oil and, most preferably, is the soybean oil described above as commercially available under the trade name BR-16 HLF.

The aliphatic esters of the invention, having carboxylic acid-derived portions of more than seven carbon atoms, are particularly useful in compositions of the invention to be used on surfaces subjected to relatively high temperatures ranging from about 350° to about 550° F. Further, the compositions of the invention applied to desired surfaces and then heated to these higher temperatures typically become substantially transparent, thus preserving the original appearance of the surface without a hazy or opaque film appearance.

The amount of the high-boiling, organic component present in the composition can vary widely but preferably is present in an amount sufficient so that, during application to the surface, the continuous coating formed on the desired surface remains essentially continuous over the entire surface as the coating dries, including those portions of the surface which may not be entirely free of preexisting organic food deposits. Typically, the high-boiling, organic component is present in relative amounts of about 4 to about 20 parts by weight, preferably about 8 to about 17 parts by weight and, most preferably, about 13 parts by weight.

In an aqueous composition, prior to application to a desired surface, the amount of thickening agent, inorganic salt, and organic component varies in terms of % by weight to the same extent as expressed above in relative terms of parts by weight.

The composition of the invention can further include a food-safe, alkali-stable dye. The dye, when present helps the use of the invention to see the aqueous composition as it is being applied to appropriate surfaces which may be dimly lit, such as those inside an oven or broiler. In this way, over-application, under-application, or gaps in the continues coating can be detected and prevented. Examples of suitable dyes include FD&C Blue #1, FD&C Yellow #6, FD&C Red #3, FD&C Green #3, FD&C Yellow #5 and mixtures thereof.

Aqueous compositions of the invention may be prepared by mixing the ingredients with water or, in the case of nonaqueous formulations, simply by mixing together the dry thickening agent, the dry inorganic salt, and the organic component, either alone or with other nonaqueous carriers which do not affect the essential characteristics of the invention. The preferred mode of preparing these compositions is by preparing an aqueous suspension containing the thickening agent and, optionally, the food-safe, alkali-stable dye; preparing a solution of the alkaline salt(s) and the optional dye in water; combining the suspension and the solution;

and, finally, adding the organic component to form the aqueous composition of the invention.

To prepare the suspension containing the thickener, the thickener is slowly added to water while agitating the mixture continuously. The rate of addition should be slow enough to avoid any agglomeration of the thickener because, with some thickeners, a rate of addition which is too fast can cause gels which do not readily disperse and cause a significant delay in production.

The temperature of the water used to make the suspension may vary widely, for example, from about 4° to about 60° C. The use of warm or hot water (from about 26° C. to about 60° C.) may accelerate the hydration of some thickeners and also produces a suspension of higher viscosity.

The type of mixing equipment employed is not critical, and either high or low speed mixing may be used. Examples of appropriate types of agitation for room temperature water (26° C.) include the use of a Waring Blender (3 minutes, 18,000 RPM for a 500 gram batch), an Eppenbach Homo-Mixer (15 minutes, 5,450 RPM for a 1,000 gram batch) or a "Lightnin"-type Mixer (30 minutes, 1,770 RPM for a 5 gallon batch). It should be note, however, that high speed mixing, such as that obtained with the Waring Blender, will reduce the time required to obtain a smooth suspension and reduce the effect of water temperature, if any, on viscosity.

Once the suspension containing the thickener has been prepared, it is preferably diluted with an aqueous solution of the inorganic salt to form a mixture to which the organic component is added. The resulting aqueous composition is then subjected to an optional final pH adjustment and mixing. The final pH adjustment may be made with any food-grade acid, preferably an inorganic food-grade acid, or with minor amounts of strong alkali such as sodium or potassium hydroxide. Typically, the pH is adjusted with a food-grade acid such as phosphoric acid.

The pH of the aqueous composition of the invention prior to application to a desired surface can vary widely, with the lower end of the useful pH range relating to the releasability or easy removal of the dried soiled film and the higher end being limited only by the possibility of eye or skin damage. Typically, the pH ranges from about 9.0 to about 14.0, preferably about 11.0 to 13.0, more preferably about 11.5 to 12.5, and most preferably about 11.8 to about 12.2.

According to the method for cleaning a surface which may be subjected to heat and is liable to soiling by organic food deposits, especially baked-on food deposits, the composition is applied to the surface, preferably when the surface is an unsoiled state but permissibly when the surface has some organic food soils remaining even after cleaning, to form a continuous coating essentially without any holes or gaps. The composition may be applied in any acceptable say. When the composition is a liquid composition, however, it is preferably applied by spraying, wiping, brushing or dipping. When the composition is not a liquid but in the form of a solid or semisolid, it is preferably applied by rubbing or spreading the composition onto the desired surface.

Most preferably, the composition is an aqueous composition which is applied by spraying, for example, either with a hand-pump sprayer or with an aerosol spray container. If an aerosol spray container is used, the composition of the invention may be packed together with about 1 to about 25% of an environmentally safe propellant.

After application of the aqueous composition to the desired surface, the resulting continuous coating is dried to form a continuous film adhered to substantially all portions, both clean and soiled, of the surface. The continuous coating is preferably dried by heating to drive off substantially all volatile liquids, such as water, in the composition to form a film which is initially durable and resistant to scuffing and chipping. However, the continuous coating may be dried by any one of several different methods, such as by allowing the coating to stand at room temperature for a predetermined period of time, heating the surface with which the coating is in contact, heating the convective air flow in contact with the coating, providing a forced flow of heated air, or heating the surface prior to application of the coating.

Preferably, the continuous coating is dried by heating the convective air flow in contact with the coating, most preferably to a temperature from about 200° F. to about 550° F., for a time sufficient to form the durable film. Typical drying times range from about 10 minutes at about 400° F to about 30-60 minutes at about 200° F.

When the coating is dried by heating, the initially durable film formed is resistant to chipping and scuffing, for example, by the insertion and removal of pans and other cooking implements into and out of an oven or broiler. By formation of such a durable film, the appropriate surfaces remain essentially covered by a protective barrier which, at the very least, physically protects the oven surfaces from burned on spattered food soils.

The continuous coating becomes substantially thinner as it dries. While the thickness of the wet continuous coating may typically vary between 0.2 and 50 mils, preferably about 2.5 mils, immediately after application, the initially durable film formed by heating the continuous coating typically only ranges from about 0.06 to about 15.0 mils, preferably between 0.6 and 1.5 mils, in thickness.

Substantially all of any volatile liquid present, such as water, is driven from the continuous coating if it is dried by heating and the resulting dried film typically contains less than 0.1% volatile liquid at the conclusion of the drying step. However, if a hygroscopic inorganic salt is used and, if no heat is used to dry the initial coating, the dried film may still contain at least part of any original water which may have been present in the composite as applied, depending upon the ambient humidity and the particular hygroscopic salt employed.

Further, a film comprising a hygroscopic salt which is exposed to the atmosphere for a prolonged period of time may gain water from the atmosphere, even if most of the water which may have been present in the composition as applied was originally lost during a heating step. The physical consistency of the film in this hydrated state can be quite similar to that of stiff "cake icing" or a paste. Thus, the at least partially hydrated film may not be as durable as the initially dried film. However, it is found that, during normal use, the at least partially hydrated film remains continuous and may be, of course, redried when the oven is heated.

When the film contains a hygroscopic salt which contains water either retained or absorbed from the atmosphere, the resulting state of hydration, as explained above, is thought to contribute to an ability of the film to at least partially saponify fatty food soils spattered onto the film, for example, during use of an oven or broiler used for the cooking or baking of food.

The relative levels of the components of any dried film is the same as the continuous coating from which it is formed when expressed in terms of parts by weight. A dried, initially durable film generally comprises from about 0.5 to about 10 parts, preferably from about 1.0 to about 3.0 parts, by weight of the thickener; from about 0.05 to about 67 parts, preferably from about 1.0 to about 50 parts, by weight of the inorganic salt; and from about 4 to about 20 parts, preferably from about 8 to about 17 parts, by weight of the high-boiling, organic component, immediately after the drying step.

After the drying step, the surfaces, covered with the dried film of the invention, can be used in the normal fashion and allowed to accumulate a substantial amount of spattered food soils and fats for a period of time up to several days or even weeks. When the user desires to remove the food soils accumulated on the film, such as when such a high level of soil as would be undesirable from an aesthetic or food quality standpoint has accumulated, the soiled film may be quickly and easily removed with water alone or with an aqueous solution, preferably by wiping the surface with a wet wiping implement, such a cloth or paper product, sponge, scrub pad or brush.

Depending on the structural complexity of the surface, removal of the soiled film can usually be performed in less than about 45 minutes, preferably less than about 30 minutes and, most preferably, in a few minutes (typically under 15 minutes, generally under 10 minutes, and often under 5 minutes). After the soiled film has been removed from the surface, the composition may be reapplied to the surface to further protect it from food soils, especially burned-on food soils, and to continue possible saponification of spattered fatty food soils.

The following examples illustrate how the aqueous compositions of the present invention may be prepared.

PREPARATION I

Manufacturing Process

Step 1

To 12,175 pounds of water in an ultra clean stainless steel mixing tank were added, with mixing, 6.5 pounds FD&C Blue #1 Dye. With continued agitation 615 pounds Veegum HS ® were poured through a ¼ inch mesh galvanized screen into the water slowly to avoid any agglomeration of the Veegum HS ®.

Step 2

To 7,930 pounds of water in a second ultra clean stainless steel mixing tank were added with mixing 2,555 pounds of anhydrous food grade tripotassium phosphate, 1,535 pounds of food grade potassium chloride and 765 pounds of food grade sodium tripolyphosphate. The solution was mixed until all ingredients were completely dissolved.

Step 3

The contents of the second tank were added to the first tank with agitation. Agitation was continued for 30 minutes.

Step 4

To the mixture of tanks 1 and 2 were added with agitation 3,590 pounds of BR-16 HLF soybean oil.

After ½ hours of mixing, the resulting suspension was drained and packaged.

EXAMPLE 1

An aqueous composition comprising 68.92% by weight water, 2.11% by weight Veegum HS ®, 8.76% by weight anhydrous food grade tripotassium phosphate, 5.26% by weight food grade potassium chloride, 2.62% by weight food grade sodium tripolyphosphate, 0.022% by weight FD&C blue dye #1 and 12.31% by weight BR-16 HLF soybean oil was sprayed, using a hand held trigger spray bottle, onto the cleaned interior surfaces of an oven in a relatively uniform, thin continuous film. The interior surfaces of the oven still had remaining several baked-on organic food deposits which had not been completely removed during the last cleaning.

The oven was heated to about 400° F. for about 15 minutes to drive off the water in the composition, thereby forming a transparent dry film. Once dried, the coating remained continuous, was difficult to remove without the use of water, and could tolerate incidental scuffing due to contact with cooking pans and racks on their way into or out of the oven.

After sufficient soil had collected on the dried film due to cooking to necessitate cleaning, the soiled dried film was removed rapidly and easily by wiping out the oven interior with a towel wet with water only. This operation was performed in a period of time under 10 minutes.

The aqueous composition was then reapplied and dried as described above.

I claim:

1. A food-safe composition for the pretreatment of a surface which is liable to soiling by organic food deposits, said composition consisting essentially of:
   a. a food-safe, inorganic thickening agent which is substantially insoluble in an alkaline aqueous composition and which is present in an amount sufficient so that, during application to the surface, the composition is capable of forming a continuous coating adhered to all desired portions of the surface;
   b. an alkaline, food-safe, water-soluble inorganic salt in an amount sufficient so that the composition is readily removable with water or an aqueous solution after the composition has been dried and soiled; and
   c. a high-boiling, organic component selected from the group consisting of (1) non-nitrogen containing ethers having more than seven carbon atoms and (2) aliphatic esters having carboxylic acid-derived portions of more than seven carbon atoms, wherein said high-boiling, organic component is present in an amount sufficient so that the continuous coating remains continuous as the coating dries.

2. The food-safe composition of claim 1 wherein the surface is subjected to heat.

3. The food-safe composition of claim 2 wherein the surface is subjected to heat and is liable to soiling by baked-on organic food deposits.

4. The food-safe composition of claim 1 wherein the composition also includes water.

5. The food-safe composition of claim 1 wherein the composition is a sprayable liquid.

6. The food-safe composition of claim 1 wherein the composition is a solid or semisolid.

7. A food-safe composition for the pretreatment of a surface which is subjected to heat and liable to soiling by baked-on organic food deposits, said composition consisting essentially of:
a. water;
b. a food-safe, inorganic thickening agent which is a smectite clay material and is present in an amount sufficient so that the composition is capable of forming a continuous coating adhered to all desired portions of the surface;
c. at least one alkaline, food-safe, water-soluble inorganic salt in an amount sufficient so that the composition is readily removable with water or an aqueous solution after the composition has been dried and soiled; and
d. a high-boiling, organic component selected from the group consisting of (1) non-nitrogen containing ethers having more than seven carbon atoms and (2) aliphatic esters having carboxylic acid-derived portions of more than seven carbon atoms, wherein said high-boiling, organic component is present in an amount sufficient so that the continuous coating remains continuous as the coating dries.

8. The food-safe composition of claim 7 wherein the thickening agent contains predominantly montmorillonite clay.

9. The food-safe composition of claim 8 wherein the thickening agent is a magnesium aluminum silicate.

10. The food-safe composition of claim 7 wherein the thickening agent is present in said composition in a relative amount of about 0.5 to about 10 parts by weight.

11. The food-safe composition of claim 10 wherein the thickening agent is present in said composition in a relative amount of about 1.0 to about 3.0 parts by weight.

12. The food-safe composition of claim 7 wherein at least one water-soluble, inorganic salt is selected from the group consisting of phosphates and condensed phosphates.

13. The food-safe composition of claim 12 wherein at least one water-soluble, inorganic salt is selected from the group consisting of tripotassium phosphate and sodium tripolyphosphate.

14. The food-safe composition of claim 7 wherein the water-soluble inorganic salt is present in said composition in a relative amount of about 0.05 parts to about 67 parts by weight.

15. The food-safe composition of claim 7 wherein the high-boiling, organic component is selected from the group consisting of vegetable oils and animal derived fatty materials.

16. The food-safe composition of claim 7 wherein the high-boiling, organic component is a vegetable oil.

17. The food-safe composition of claim 15 wherein the high-boiling, organic component is a soybean oil.

18. The food-safe composition of claim 7 wherein the high-boiling, organic component is present in said composition in a relative amount of about 4 to about 20 parts by weight.

19. The food-safe composition of claim 7 further consisting essentially of an alkali metal halide salt.

20. The food-safe composition of claim 7 further consisting essentially of a food-safe, alkali-stable dye.

21. The food-safe composition of claim 7 wherein the composition, prior to application to the surface, has a pH from about 9.0 to about 14.0.

22. A food-safe composition for the pretreatment of a surface which is subjected to heat and liable to soiling by baked-on organic food deposits consisting essentially of:
a. water;
b. a food-safe, inorganic thickening agent which is a magnesium aluminum silicate, said thickening agent being present in said composition in a relative amount of about 0.5 to about 10 parts by weight, so that the composition is capable of forming a continuous coating adhered to all desired portions of the surface;
c. at least one alkaline, food-safe, water-soluble inorganic salt selected from the group consisting of tripotassium phosphate, trisodium phosphate, sodium tripolyphosphate and potassium tripolyphosphate in a relative amount in said composition of about 0.05 to about 67.0 parts by weight, so that the composition is readily removable with water or an aqueous solution after the composition has been dried and soiled;
d. a soybean oil present in said composition at a relative level of about 4 to about 20 parts by weight; and
e. a FD&C Blue #1 Dye present in said composite at a relative level of about 0.01 to about 0.03 parts by weight; wherein the composition, prior to application to the surface, has a pH of about 11.5 to 12.5.

23. A continuous food safe film adhered to a surface which is liable to soiling by organic food deposits, said film having been dried, consisting essentially of:
a. a food-safe, inorganic thickening agent which is substantially insoluble in an alkaline aqueous composition and which is present in an amount sufficient so that the film was produced from a continuous coating on said surface;
b. an alkaline, food-safe, water-soluble inorganic salt in an amount sufficient so that the film is readily removable with water or an aqueous solution after soiling; and
c. a high-boiling, organic component selected from the group consisting of (1) non-nitrogen containing ethers having more than seven carbon atoms and (2) aliphatic esters having carboxylic acid-derived portions of more than seven carbon atoms, wherein said high-boiling, organic component is present in an amount sufficient so that the continuous coating remains continuous as the coating dries.

24. The film of claim 23 wherein the thickening agent is present in said film in a relative amount of about 0.5 to about 10 parts by weight and the water-soluble inorganic salt is present in said film in a relative amount of about 0.05 parts to about 67 parts by weight.

25. The film of claim 23 wherein the film is about 0.06 to about 15.0 mils thick.

26. A continuous food safe film adhered to a desired surface which is subjected to heat and liable to soiling by baked-on organic food deposits, said film having been dried, consisting essentially of:
a. a food-safe, inorganic thickening agent which is a smectite clay material substantially insoluble in an alkaline aqueous composition and which is present in an amount sufficient so that the film was produced by a continuous coating adhered to the surface;
b. at least one alkaline, food-safe, water-soluble inorganic salt selected from the group consisting of phosphates and condensed phosphates in an amount sufficient so that the film is readily removable with water or an aqueous solution after soiling; and c. a high-boiling, organic component selected from the group consisting of (1) non-nitrogen containing ethers having more than seven carbon atoms and (2) aliphatic esters having carboxylic acid-derived portions of more than seven carbon atoms, wherein said high-boiling, organic component is present in an amount sufficient so that the continuous coating remains continuous as the coating dries.

27. The film of claim 24 wherein the thickening agent contains predominantly montmorillonite clay and wherein at least one water-soluble, inorganic salt is selected from the group consisting of tripotassium phosphate and sodium tripolyphosphate.

28. The film of claim 26 wherein the high-boiling organic component is a soybean oil.

29. A method for cleaning a desired surface which is liable to soiling by organic food deposits comprising the steps of:
   a. applying to the surface a food-safe composition consisting essentially of:
      i. a food-safe, inorganic thickening agent which is substantially insoluble in an alkaline aqueous composition and which is present in an amount sufficient so that the composition is capable of forming a continuous coating adhered to all desired portions of the surface;
      ii. an alkaline, food-safe, water-soluble inorganic salt in an amount sufficient so that the composition is readily removable with water or an aqueous solution after the composition has been dried and soiled; and
      iii. a high-boiling, organic component selected from the group consisting of (1) non-nitrogen containing ethers having more than seven carbon atoms and (2) aliphatic esters having carboxylic acid-derived portions of more than seven carbon atoms, wherein said high-boiling, organic component is present in an amount sufficient so that the continuous coating remains continuous as the coating dries, to form a continuous coating on the surface;
   b. drying the continuous coating to form a film;
   c. allowing the film to become soiled; and
   d. removing the soiled film by contacting the soiled film with water or an aqueous solution.

30. The method of claim 29 wherein the desired surface is subjected to heat.

31. The method of claim 29 wherein the composition is a sprayable liquid.

32. A method for cleaning a desired surface which is subjected to heat and liable to soiling by baked-on organic food deposits comprising the steps of:
   a. applying to the surface a food-safe composition consisting essentially of:
      i. water;
      ii. a food-safe, inorganic thickening agent which is a smectite clay material substantially insoluble in an alkaline aqueous composition, and which is present in an amount sufficient so that the composition is capable of forming a continuous coating adhered to all desired portions of the surface;
      iii. at least one alkaline, food-safe, water-soluble inorganic salt selected from the group consisting of phosphates and condensed phosphates in an amount sufficient so that the composition is readily removable with water or an aqueous solution after the composition has been dried and soiled; and
      iv. a high-boiling, organic component which is selected from the group consisting of vegetable oils and animal-derived fatty materials, to form a continuous coating on the surface;
   b. drying the continuous coating to form a film;
   c. allowing the film to become soiled; and
   d. removing the soiled film by contacting the soiled film with water or an aqueous solution.

33. The method of claim 32 wherein the thickening agent is a magnesium aluminum silicate.

34. The method of claim 32 wherein the thickening agent is present in said composition in a relative amount of about 0.5 parts to about 10.0 parts by weight.

35. The method of claim 32 wherein the at least one water-soluble inorganic salt is selected from the group consisting of tripotassium phosphate and sodium tripolyphosphate.

36. The method of claim 32 wherein the water-soluble inorganic salt is present in said composition in a relative amount of about 0.05 to about 67 parts by weight.

37. The method of claim 32 wherein the high-boiling, organic component is a soybean oil.

38. The method of claim 32 wherein the high-boiling, organic component is present in said composition in a relative amount of about 4 to about 20 parts by weight.

39. The method of claim 32 wherein the composition, prior to application to the surface, has a pH from about 9.0 to about 14.0.

40. The method of claim 32 wherein the composition also consists essentially of a alkali metal halide salt.

41. The method of claim 32 wherein the composition also consists essentially of a food-safe, alkali-stable dye.

42. The method of claim 32 wherein the composition is applied by spraying, wiping, brushing or dipping.

43. The method of claim 32 wherein the continuous coating is dried by heating.

44. The method of claim 32 wherein the soiled film is removed by wiping with a wiping implement wet with water or an aqueous solution.

45. The method of claim 32 further comprising the additional step of reapplying the composition to the surface after said removal step.

46. A method for cleaning a desired surface which is subjected to heat and liable to soiling by baked-on organic food deposits comprising the steps of:
   a. applying to the surface a food-safe composition consisting essentially of:
      i. water;
      ii. a food-safe, inorganic thickening agent which contains predominantly montmorillonite clay and is substantially insoluble in an alkaline aqueous composition, said thickening agent being present in said composition in a relative amount of about 0.5 to about 10.0 parts by weight, so that the composition is capable of forming a continuous coating adhered to all desired portions of the surface;
      iii. at least one alkaline, food-safe, water-soluble inorganic salt selected from the group consisting of tripotassium phosphate, sodium tripolyphosphate and potassium tripolyphosphate, present in said composition in a relative amount of about 0.5 to about 67.0 parts by weight, so that the composition is readily removable with water or an aqueous solution after the composition has been dried and soiled; and iv. a soybean oil present in said composition in a relative amount of about 4 to about 20 parts by weight, so that the continuous coating remains continuous as the coating dries; to form a continuous coating on the surface;

b. drying the continuous coating to form a film;

c. allowing the film to become soiled;

d. removing the soiled film by contacting the soiled film with water or an aqueous solution; and e. reapplying the composition to the surface after the removal step (d).

47. The method of claim 46 wherein at least one water-soluble inorganic salt is selected from the group consisting of tripotassium phosphate and sodium tripolyphosphate.

48. The method of claim 45 wherein the composition, prior to being applied to the surface, has a pH from about 9.0 to about 14.0.

49. The method of claim 46 wherein the composition also consists essentially of an alkali metal halide salt.

50. The method of claim 46 wherein the composition also consists essentially of a food-safe, alkali-stable dye.

51. The method of claim 46 wherein the composition is applied or reapplied by spraying.

52. The method of claim 46 wherein the continuous coating is dried by heating a convective air flow in contact with the surface to a temperature from about 200° F. to about 550° F.

53. The method of claim 52 wherein the continuous coating is dried by heating at a temperature of about 400° to about 450° F. to form a film.

54. The method of claim 46 wherein the surface is that of an oven or a boiler.

* * * * *

UNITED STATES PATENT AND TRADEMARK OFFICE
CERTIFICATE OF CORRECTION

PATENT NO. : 5,137,793
DATED : August 11, 1992
INVENTOR(S) : John R. Cockrell, Jr.

It is certified that error appears in the above-identified patent and that said Letters Patent is hereby corrected as shown below:

Title Page, Assignee, change "Kay Chemical COmpany" to --Kay Chemical Company--.

Claim 22, column 14, line 23, change "composite" to --composition--.

Claim 23, column 14, line 27, change "food safe" to --food-safe--.

Claim 26, column 14, line 55, change "food safe" to --food-safe--.

Claim 47, column 17, line 15, after "wherein" insert --the--.

Claim 48, column 18, line 1, change "claim 45" to --claim 46--.

Signed and Sealed this

Thirty-first Day of August, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.  : 5,137,793
DATED       : August 11, 1992
INVENTOR(S) : John R. Cockrell, Jr.

It is certified that error appears in the above-identified patent and that said Letters Patent is hereby corrected as shown below:

Claim 40, column 16, line 33, before "alkali" change "a" to --an--.

Claim 54, column 18, line 18, change "boiler" to --broiler--.

Signed and Sealed this

First Day of February, 1994

Attest:

BRUCE LEHMAN

Attesting Officer

Commissioner of Patents and Trademarks